(12) United States Patent
Farmer

(10) Patent No.: US 8,463,803 B2
(45) Date of Patent: Jun. 11, 2013

(54) WEB-BASED MARKETING MANAGEMENT SYSTEM

(75) Inventor: David E. Farmer, Dallas, TX (US)

(73) Assignee: Ad Giants LLC, Dallas, TX (US)

( * ) Notice: Subject to any disclaimer, the term of this patent is extended or adjusted under 35 U.S.C. 154(b) by 0 days.

(21) Appl. No.: 13/569,252

(22) Filed: Aug. 8, 2012

(65) Prior Publication Data

US 2012/0303467 A1 Nov. 29, 2012

Related U.S. Application Data

(63) Continuation of application No. 12/540,630, filed on Aug. 13, 2009, now Pat. No. 8,271,507, which is a continuation-in-part of application No. 11/046,040, filed on Jan. 28, 2005, now Pat. No. 7,596,561.

(60) Provisional application No. 60/540,400, filed on Jan. 30, 2004.

(51) Int. Cl.
*G06F 17/30* (2006.01)

(52) U.S. Cl.
USPC .......................... 707/756; 707/783; 707/805

(58) Field of Classification Search
USPC .............. 707/756, 783, 805; 705/14.4, 14.41, 705/14.49, 14.72, 14.73
See application file for complete search history.

(56) References Cited

U.S. PATENT DOCUMENTS

| | | | |
|---|---|---|---|
| 6,129,717 A | 10/2000 | Fujioka et al. | |
| 6,931,591 B1 | 8/2005 | Brown et al. | |
| 2002/0049833 A1 | 4/2002 | Kikinis | |
| 2002/0120506 A1* | 8/2002 | Hagen | 705/14 |
| 2002/0133402 A1 | 9/2002 | Faber et al. | |
| 2002/0177114 A1 | 11/2002 | Klauder | |
| 2004/0103026 A1 | 5/2004 | White | |
| 2004/0143516 A1* | 7/2004 | Hastie et al. | 705/27 |
| 2004/0153366 A1 | 8/2004 | Olson et al. | |
| 2004/0210483 A1* | 10/2004 | Watkins et al. | 705/14 |
| 2004/0254860 A1 | 12/2004 | Wagner et al. | |
| 2005/0076039 A1 | 4/2005 | Ludwig et al. | |
| 2005/0171951 A1 | 8/2005 | Farmer | |
| 2005/0289015 A1* | 12/2005 | Hunter et al. | 705/27 |
| 2007/0168256 A1 | 7/2007 | Horstmann | |
| 2009/0049405 A1 | 2/2009 | Lockhart et al. | |
| 2009/0281973 A1 | 11/2009 | Selinger et al. | |

* cited by examiner

*Primary Examiner* — John E Breene
*Assistant Examiner* — Dennis Myint
(74) *Attorney, Agent, or Firm* — Fraser Clemens Martin & Miller LLC; William J. Clemens

(57) ABSTRACT

A server runs a software program controlling a system and is connected to the Internet to communicate with one or more advertising agencies. A client of the agencies has a home location with a server connected to the Internet for communication with the server and the agencies. The client can have branches that are connected to the Internet for communication with the server and the Client Home and, in some circumstances, with the agencies. Also connected to the Internet are Media parties representing any and all types of advertising display parties such as radio, television, print, billboard, etc. The media parties also could be brokers that place the advertising with various media outlets.

14 Claims, 8 Drawing Sheets

WEB-BASED MARKETING MANAGEMENT SYSTEM

CROSS-REFERENCE TO RELATED APPLICATIONS

This application is a continuation of U.S. patent application Ser. No. 12/540,630 filed on Aug. 13, 2009, which in turn is a continuation-in-part of U.S. patent application Ser. No. 11/046,040 filed on Jan. 28, 2005, which issued as U.S. Pat. No. 7,596,561 on Sep. 29, 2009, and which in turn claims the benefit of U.S. provisional patent application Ser. No. 60/540,400 filed on Jan. 30, 2004. The entire disclosures of the above applications are hereby incorporated herein by reference.

FIELD OF THE INVENTION

The present invention relates generally to a system for managing marketing programs using a web-based computer program to link advertising agencies, clients and media outlets for the dynamic creation, modification and placement of advertising materials

BACKGROUND OF THE INVENTION

Advertising programs typically are created by advertising agencies on behalf of clients that desire to advertise products and/or services locally, nationally, or both. The advertising agencies control the "assets" (the advertising materials to be used) and placement with the media. Thus, changes and customization for different local markets can be costly and time consuming since the client must return to the advertising agency each time.

SUMMARY OF THE INVENTION

In concordance with the instant disclosure, a system and method for changing and customizing advertisements for different local markets, which is inexpensive and efficient, is surprisingly discovered.

In one embodiment, a system for marketing management including dynamic advertisement creation and customization comprises: a database storing a plurality of modifiable advertisements, each of said stored advertisements including a plurality of components for creating a display of said stored advertisement wherein each of said stored advertisements is used to advertise at least one of a product and a service; an administrator server computer connected to said database, said server computer running a computer program permitting client access to said database; and at least one user computer remotely connected to said server computer whereby an client can login at said at least one user computer and modify individual ones of said plurality of components of a selected one of said stored advertisements, wherein the display of the selected one of said stored advertisements is changed when used to advertise at least one of the product and the service.

In another embodiment, a method for marketing management including dynamic advertisement creation and customization comprises the steps of: a. providing a database and storing in the database a plurality of modifiable advertisements, each of the stored advertisements including a plurality of components for creating a display of the stored advertisement wherein each of the stored advertisements is used to advertise at least one of a product and a service; b. providing an administrator server computer and connecting the server to the database; c. running a computer program on the server computer permitting an client at a remote computer access to the database in response to a predetermined login by the client; d. displaying a one of the stored advertisements selected by the client on the remote computer; and e. permitting the client to modify individual ones of the plurality of components of the selected one stored advertisement and store the modified advertisement in the database. The display of the selected one of said stored advertisements is changed when used to advertise at least one of the product and the service.

The Ad Giants ONE System V6 ushers in the next generation marketing support system. In one simple, sophisticated tool, clients enjoy easy access to a single platform for storing, securing, customizing, localizing, personalizing, distributing and fulfilling virtually all of the clients' advertising and direct-marketing programs. This includes print, email, direct mail, personalized web sitelets (purls), radio and television campaigns.

To provide the ultimate in user-friendly navigation, the process of locating and customizing client marketing materials is more convenient than ever thanks to a new storefront design that resembles the e-commerce sites with which clients are already familiar. The system's Partner Portal includes a slate of fulfillment and value-added services. A new Marketing Intranet containing collaboration tools that simplify communication, coordination and execution of the client's marketing programs is also present.

DRAWINGS

The above, as well as other advantages of the present invention, will become readily apparent to those skilled in the art from the following detailed description of a preferred embodiment when considered in the light of the accompanying drawings in which:

FIG. 6 is a screen display of a marketing storefront of the system in accordance with the present invention;

FIG. 7 is a screen display of an interface for customizing a print template.

DETAILED DESCRIPTION OF THE INVENTION

Figure 1:
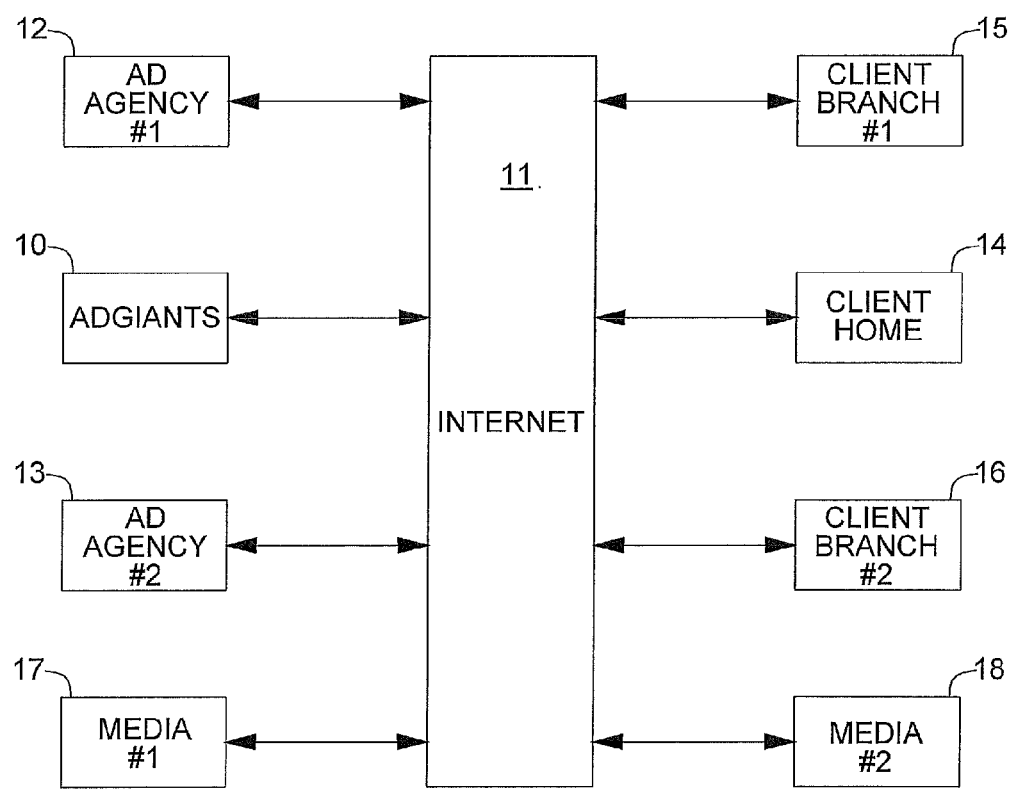
FIG. 1 is a schematic block diagram of communication interconnection between parties using the system in accordance with the present invention.

The following description is merely exemplary in nature and is not intended to limit the present disclosure, application, or uses. It should be understood that throughout the drawings, corresponding reference numerals indicate like or corresponding parts and features.

The present invention concerns a revolutionary marketing management and fulfillment system built on a distributed application environment framework. It leverages key benefits of both client and server platforms to maximum advantage; providing an extremely rich yet versatile client interface, coupled to a powerful and robust backend server architecture, and optimized for the bandwidth, stability and security concerns inherent with the Internet. The system includes dynamic online ad creation and ordering through conventional business personal computers and can even be operated from many cell phones or PDA's while using even the slowest speed Internet connection.

FIG. 1 is a block diagram of the communication interconnection between the various parties using the system according to the present invention. In the following, "Ad Giants" refers to the party maintaining the system. An "Ad Giants" administrator server 10 runs the software program controlling the system and is connected to the Internet 11. The "Ad Giants" server 10 communicates over the Internet 11 with a first advertising agency Ad Agency #1 12 and a second Ad Agency #2 13. Typically, the agencies 12 and 13 will each have a server permitting numerous employees to communicate with the "Ad Giants" server 10. For the purposes of this example, only two agencies are shown although the system according to the present invention also will work with one agency and more than two agencies.

A client of the agencies 12 and 13 has a home location 14 with a server connected to the Internet 11 for communication with the "Ad Giants" server 10 and the agencies 12 and 13. The client 14 can have a Client Branch #1 15 and a Client Branch #2 16 that are connected to the Internet 11 for communication with the "Ad Giants" server 10 and the Client Home 14, and, in some circumstances, with the agencies 12 and 13. The system according to the present invention will work with more than one client and such clients may have no branches or one or more branches.

Also connected to the Internet are a Media #1 17 and a Media #2 18 representing any and all types of advertising display parties such as radio, television, print, billboard, etc. The media parties also could be brokers that place the advertising with various media outlets. Although two media parties are shown in this example, any number can be connected in the system.

The software program running on the "Ad Giants" server 10 controls the flow of communication thereby restricting access to information and limiting the authority of the parties. The server 10 includes a computer connected to a database of stored advertising assets such as television and radio spots, newspaper ads, billboard ads, and the like.

The system according to the present invention has a platform that is compatible with numerous OS and hardware platforms, and easily acquired for those not already running it. The platform also provides a rich, flexible and dynamic user interface, and is able to work with a wide range of different media types. This stable platform is mature and proven in its capabilities; it is a highly adopted and well supported platform (should a problem arise, the manufacture and/or developer community must be quick to provide a solution). The preferred platform is Macromedia's Flash Player, now in its sixth iteration, wherein the SWF format (the underlying file type behind Flash technology) is quickly becoming the preferred platform for Web applications. Flash is a key technology for client solutions for the following reasons:

Market Penetration—while the dust is still settling from the long standing "browser wars", Macromedia Flash Player has managed to acquire greater market penetration than any browser; more than 98% of computers connected to the Net have Flash Player 4 or newer installed, while more than 75% currently run the latest Flash Player 6; also, Flash Player comes pre-installed with most new OS's and browsers.

Ease of Installation—the Flash Player is a mere 400K in size and is easily installed as either a browser plug-in or, in the case of Internet Explorer, an ActiveX control; this means that even on a dial-up connection the download and installation only takes a couple of minutes; in addition, Flash movies can be distributed as self-contained files that include the Player within them, eliminating the need for a Web browser as a shell application.

Platform Support—the latest Flash Player is available for all major flavors of Microsoft Windows (including 95, 98, ME, NT, 2000, XP, and CE) and Mac OS in addition to supporting a growing number of cell phones, PDA's, interactive TV, game consoles, and other emerging digital devices.

Rich Media Support—Flash supports both vector and raster images, audio, video, HTML, and XML data in various formats; this makes Flash the richest, most dynamic environment for displaying and combining compelling multimedia; Flash is also able to break out of the constraining page metaphor of HTML—data can be loaded and events can occur without having to reload a page.

Dynamic Data—Flash's support for dynamic data has grown incredibly with its latest release; in addition to dynamically loading JPEG images and MP3 audio, Flash is capable of loading external data in various forms, opening XML sockets, or directly communicating with databases via Flash Remoting.

Open Standard—the SWF format is an open standard which has led to various non-Macromedia solutions for creating and working with SWF files; this also opens the door for building custom extensions to the SWF format to serve our needs into the future.

Streaming Capabilities—the Flash format is inherently optimized for streaming meaning that movies can begin playing while still downloading; additionally, other SWF and FLV (Flash video) files, JPEG's, and MP3's can also be dynamically streamed into a loaded movie.

Communication—with the introduction of Macromedia Flash Communication Server, text, voice, and video conferencing become available both live and stored streaming formats and in peer-to-peer and large audience net casting environments; accompanying applications such as whiteboards also become viable components.

Data Caching—Flash Player allows the user to specify how much local disk space is available to a movie in which to store data; this allows efficient caching of commonly used data on users' systems and also permits work while disconnected from the network.

The "Ad Giants" server 10 has a backend architecture that provides a solid foundation for developing enterprise level critical applications. A highly stable and scalable platform is required that can power demanding processes sure to grow in number over time. The server software must also support the demanding requirements of the application functionality while smoothly and efficiently communicating with the client platform. At the same time, affordability must be maintained in order make the product a viable and marketable solution.

The server-side architecture is described in the following by platform, database, components, and processing engine (s):

Platform—the Microsoft Windows 2000 Server architecture is favored as the primary server OS, as it balances affordable costs with highly flexible solutions for both hardware and software. Extremely powerful, multi-processor systems can be constructed for relatively little compared to other server platforms since Windows is designed for widely available and affordable PC hardware. Meanwhile, Microsoft Windows is the most widely supported developer platform, for both client and server OS's, which translates into a huge and ever growing number of software solutions available for the platform. In fact many of the server software components that are used by Ad Giants 2.0 are only available for Microsoft Windows 2000 Server.

Database—Given the choice of the Microsoft OS platform and the need for critical storage of data, Microsoft's SQL Server database is preferred. SQL Server is an efficient and proven database platform that is highly scalable while also supporting flexible means of communicating its data. It also integrates well with the chosen languages used for the middle-tier components.

Components—Various middle-tier components have been developed or implemented that tie the database, processing engine(s), and client platform together. These components are the master coordinators, responding to both client and server events and in turn instantiating new processes. As a result of the demands of the various server technologies that are used, Ad Giants 2.0 utilizes ASP NET components objects to control the server behavior. Components are used in nearly every facet of the Ad Giants application, from logon and communication, to asset management and ad ordering.

Processing Engine(s)—With its marketing production focus, it is natural that Ad Giants would require a means for processing and producing image files for final print output. Who better to turn to than the originators of most of the print and digital publishing technology in use today, Adobe. Adobe has increasingly focused its sites on the growing server market and promises to offer many solutions that Ad Giants can leverage to provide powerful solutions to its clients. Currently, Ad Giants is tapping the power of Adobe's Graphic Server 2.0 software for a number of uses, from generating dynamic thumbnails for uploaded images, to decompiling complex page layouts in order to free them for editing and manipulation through the client interface. And, of course, Graphic Server plays a critical role in producing the final print ready files Ad Giants has, and continues to work with Adobe to help define the desired capabilities of their growing and evolving server solutions.

Additional tools are included in this system that will further enhance the importance and role Ad Giants can and will play in the user's environment. Since the Ad Giants system can be customized for so many broad-reaching companies that have individual structures, these additional tools are a part of the base offering to reach an even higher level of savings and efficiencies.

Alternative Platforms—The Ad Giants application, founded on the powerful and versatile Flash environment, allows for porting of client-side functionality to any device that is supported by the latest Flash Player (including PDA's, cell phones, interactive TV systems, and a growing number of others, in addition to Microsoft Windows, Mac OS's, and Linux). This means that any implementation of the Ad Giants application can be accessible to any one with even a small handheld device and an Internet connection.

Unplugged Functionality—Current developments in the Flash application architecture will permit greater caching and subsequent synchronization of data while disconnected from the network. This will permit users on the go to continue to perform many of the critical tasks of the system while on the go or temporarily without network access.

Customizable Windows Interface—It is quite possible to provide a vast array of options for working with the Ad Giants application and its various tool windows. For instance, one could break out the messaging, news and calendar functions into their own windows outside of the main application interface, thus allowing a user to keep them open at the edge of one's screen while continuing to do other day-to-day work; Ad Giants functionality still just a click away. Increasing integration of Web technologies into OS's offers many other possibilities, such as integration into the actual user's desktop.

Branch Sub-Servers—Placement of servers into local branches brings many enhancements. Aside from the more obvious network gains through increased speed and proximity, a local server can provide other important benefits: digitization and archiving of office documents provides central access and management of assets; day-to-day work flows can be incorporated into the application (such as scheduling, tracking, and reporting on calls and other tasks); and sharing of contacts and appointments, project and team management.

Shared Data Websites—Any information and assets entered into the system could easily serve as the basis for a dynamic website, where any changes would be instantly reflected in both systems. For instance, indexing new products or modifying current product properties (price, description, etc.) within the Ad Giants application would result in the public website's catalog being updated also.

The following support tools are provided:

Help—The Help tool can grow in many exciting ways. Live, interactive chat can be introduced that route to either internal or external support specialists. Text, video, and voice can all be used to facilitate and easy and direct communications. Guided help with the interface displaying what the client must do, either controlled by the support representative or a built in Wiseguy can help illustration important steps and concepts. Creative assistants can even help by collaborating with the user on layouts in real time. Finally, online classes and seminars can be hosted that allow speakers and instructors to broadcast to a large number of users at once.

Calendar—The Calendar's task and event scheduling and tracking can be further augmented with in-depth project and team management tools that aid in daily operations.

Community—The Community and Communication tools offer many opportunities for increased functionality. Many advanced instant messenger features can be incorporated into it such as file sharing (both with already archived assets and personal files on the users' systems), voice/video teleconferencing, shared whiteboard and template creation collaboration, net casting (broadcasting of voice/video events to a large audience), and even an email client (with import/export capabilities to Outlook and other popular email client software).

Directory—The Directory of contacts and businesses can be further bolstered by building on its basic structure to include a comprehensive personal address book that could be tied to external contact databases (customers, company, suppliers, etc.) as well as support importing/exporting of contact files.

Asset Management—The Lightbox (Asset Management Tool), though already very powerful on its own, will be improved by adding file versioning (the ability to store and track numerous versions of files, preventing users from overwriting each other's work and maintaining a history of changes), associated file merge functions (for combining changes in different versions of documents), file check-in/out (that would make checked-out files read only for other users until they were checked back in), batch processing of tasks (such as resizing images or outputting them in different formats) as well as batch uploading/downloading (uploading or downloading multiple files at once), highly automated archiving of assets (for instance, Microsoft Office documents amongst many others have extended file attributes that be used to auto-complete many of the fields necessary for indexing an asset into the system—i.e. author, date created, title, subject, etc.), and, finally, the increased ability to further compile/decompile numerous file types (such as PDF, EPS, PSD, XML, and others; any such file could be seamlessly edited within or outside of the application and yet be made immediately accessible via file upload/download to the other platform, local system or Ad Giants application).

The system includes the following productivity tools:

Template Tool—Current localization and simple editing features of the Template tool will be built on to offer more advanced features. Complete, powerful layout capabilities are possible that would allow most of the functionality of expensive page layout software such as Adobe PageMaker or Quark Xpress. Meanwhile, localization functions will be improved by allowing batch processing (scripting) of templates (i.e. the client could select all of the stores that an ad was to be localized for and have the system output all of the modified final files). And of course, some of the features mentioned above such as template sharing/collaboration, and compiling/decompiling of various file types will be added.

Audio/Video Editing—Whereas currently any changes to audio or video templates (TV or radio ads) must be processed by a studio after ordering, it will be possible to use other software to allow automated editing and output of these files. This would be easiest in the case of video where the tag line is all that changes, but could also be feasible for other more advanced operations. This will end up saving huge amounts of money since post-production costs are very high.

Sub-Accounts—Sub-accounts for clients, contractors, and suppliers can facilitate access to reduced functionality tools such as the Lightbox, order fulfillment tools, or even some of the template tools. This could, for example, allow contractors to perform some tasks through the system while preventing them full access to the application.

Marketing Management Tools—Marketing plan and campaign tools could be added and bolstered. Defining of goals, budget, etc. and tracking of costs, progress, templates, orders, results, etc. will help in managing and planning marketing strategies. Reports will be generated that illustrate the effectiveness of ads and campaigns, chart spending vs. sales, and other powerful decision making documents.

Market Research Tools—Market research tools will help in planning and implementing market research as well as provide a library of past market research reports.

Figure 2:
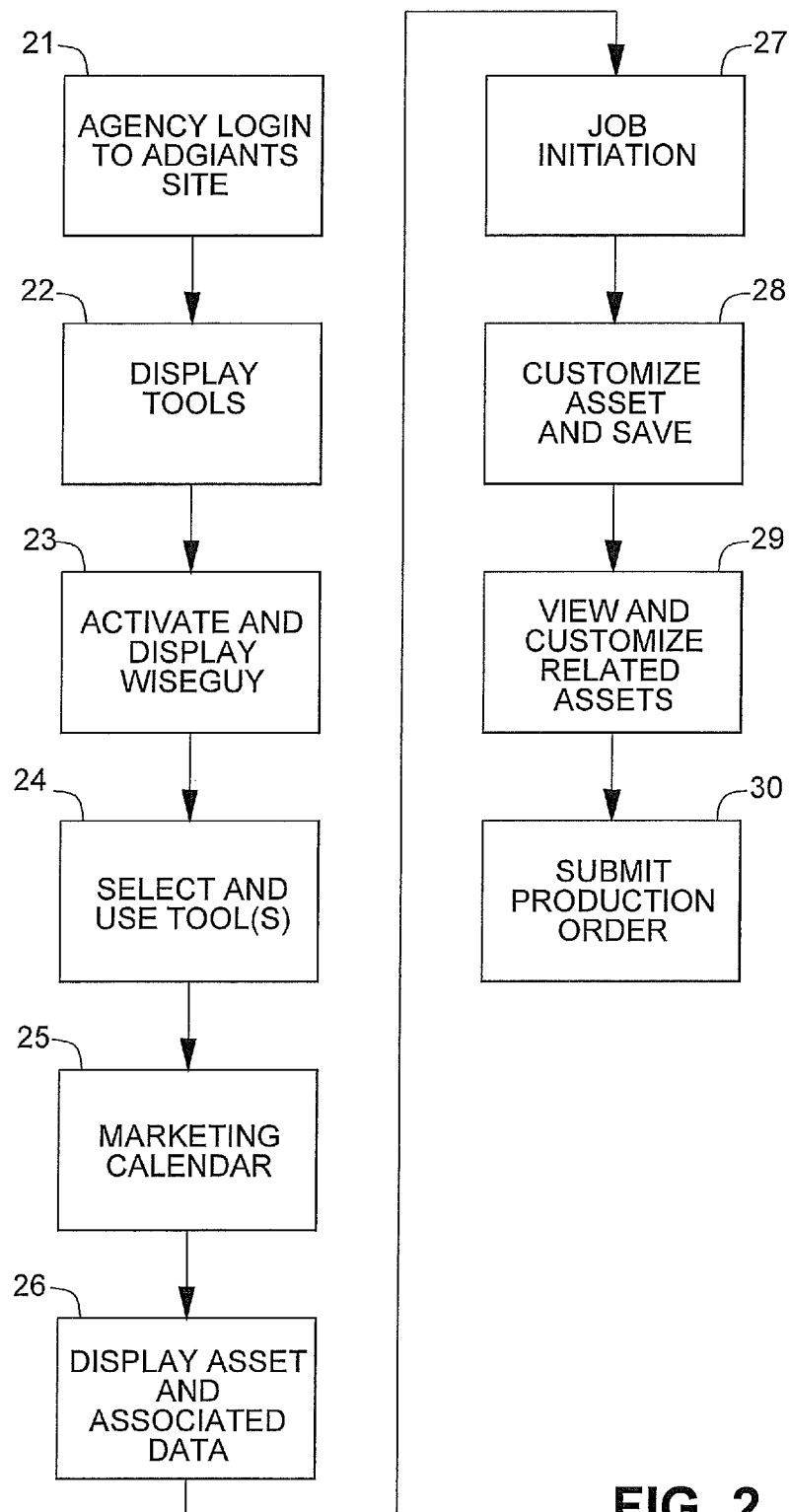
FIGS. 2 and 3 are flow diagrams of the method of using the system according to the present invention.

The system according to the present invention is accessed and used as described below with reference to FIG. 2. A website maintained by "Ad Giants" is operated on the server 10 (FIG. 1). In the following description, three levels of access are used in the example, but more or less than three could be used within the scope of the invention. The method according to the present invention begins with a login at "Login to Ad Giants Site" 21 via one of three doorways. The three categories of users each associated with a separate doorway are: 1) the client (the entity that is advertising); 2) the agency (responsible for creating and placing the advertising); and 3) the owner/operator (affiliated with the client in the geographic area in which the advertising is run).

Once the user is identified, authorization and category, the website displays a set of tools at "Display Tools" 22 that are available to the category of user. Also, an animated and speaking "wiseguy" is provided at "Activate and Display Wiseguy" 23. The "wiseguy" can be, for example, a corporate spokesperson such as Ronald McDonald of McDonald's Corporation. The "wiseguy" speaks comments, instructions, helpful hints, questions, etc. and is interactive in response to the user inputs.

The user is now ready to use the displayed tools at "Select and Use Tools(s)" 24. For example, for an agency user a Marketing Calendar display 25 can be selected to permit viewing by national or regional, date and asset. The selected asset is then displayed at "Display Asset and Associated Data" 26 in the associated format. Details of the asset are available for viewing such as title, description, cost, start and end dates, etc.

The agency user can initiate a new job at "Job Initiation" 27 utilizing current assets. The selected asset can be customized in every aspect or component and saved at "Customize Asset and Save" 28. Next, related assets can be viewed and customized at "View and Customize Related Assets" 29. An example of related assets is a newspaper ad associated with a television ad that has been customized. The user then submits a production order at "Submit Production Order" 30 to finalize the changes.

Figure 3:
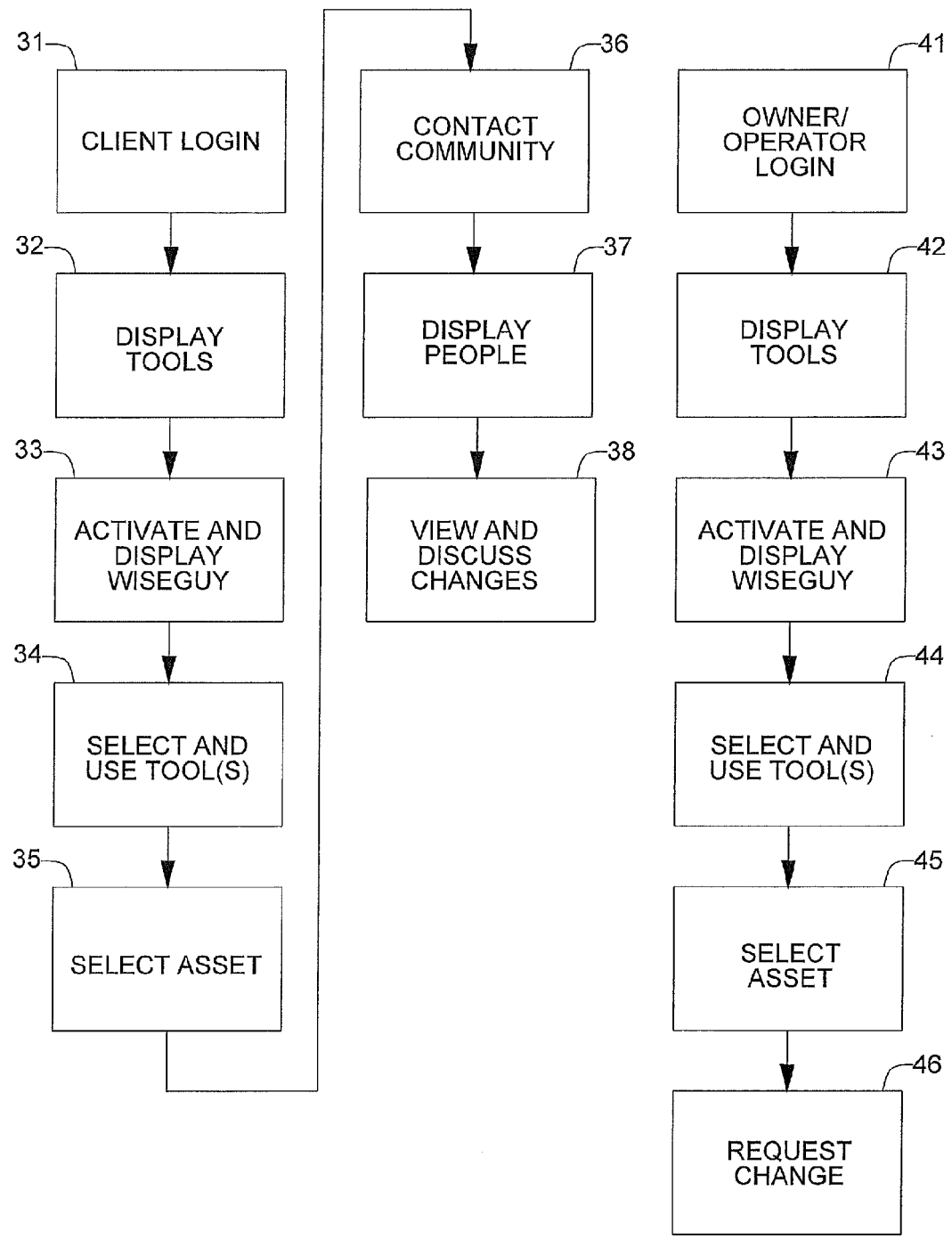

The client and owner/operator flow diagrams are shown in FIG. 3. Steps 31 through 34 for the client and steps 41 through 44 for the owner/operator are the same as the steps 21 through 24 shown in FIG. 2. The client then selects an asset at "Select Asset" 35 and contacts persons who will discuss changes to the asset at "Contact Community" 36. Those persons might include an account representative of the responsible advertising agency, a creative person who will make the changes and a media placement person. The persons in the community can observe each other via video feeds to and from different locations at "Display People" 37. The system and method according to the present invention permits the selected asset and proposed changes to be viewed and discussed via "View and Discuss Changes" 38.

The owner/operator can select an asset at "Select Asset" 45 for viewing. Then the owner/operator can request changes to the selected asset at "Request Change" 46.

Figure 4:
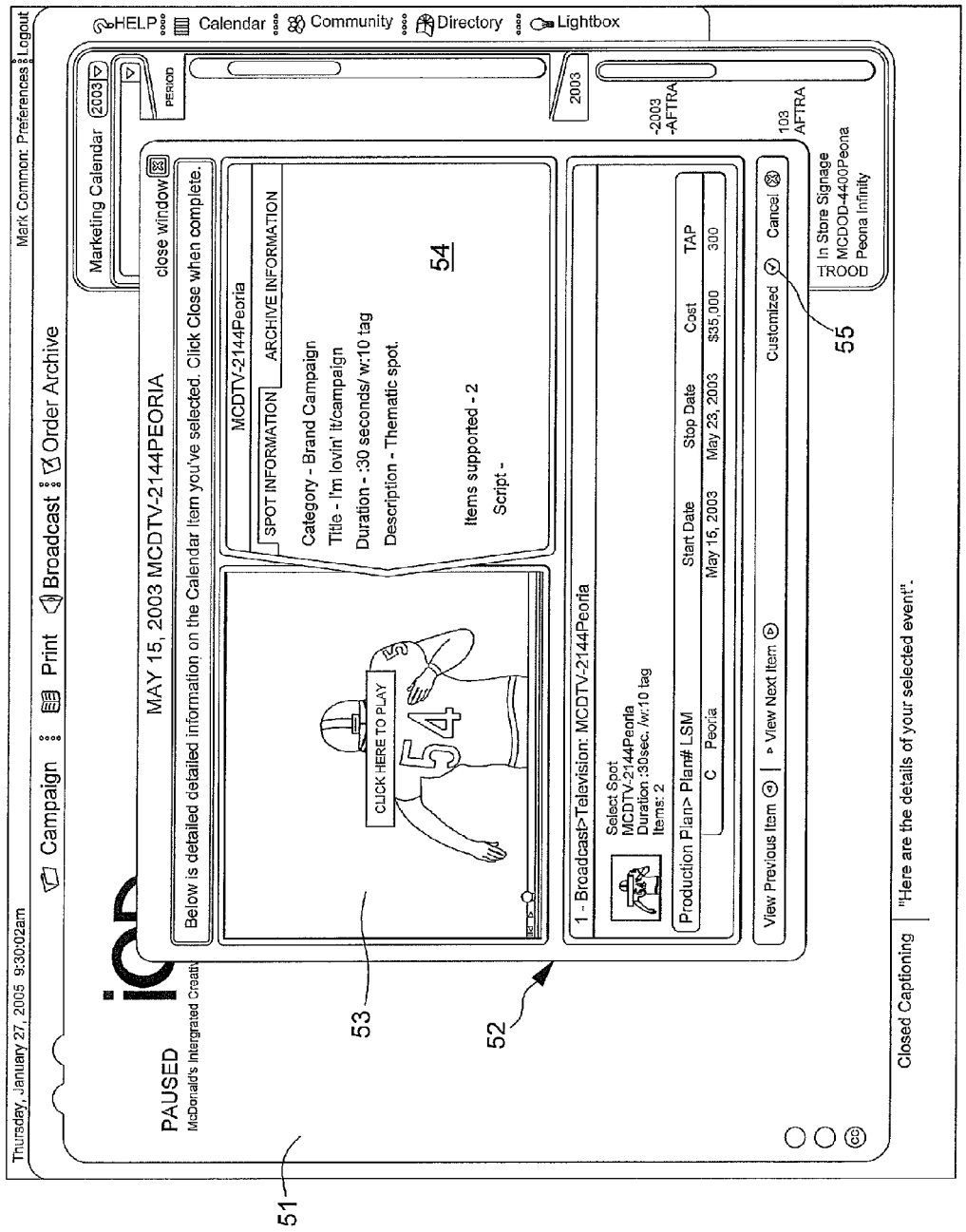
FIG. 4 is a screen display of a selected asset.

FIG. 4 is a screen display showing a typical computer monitor display 51 generated by the system according to the present invention. Superimposed on the display 51 is a widow 52 displaying a selected asset. In this example, a television spot is displayed in a video clip area 53 and an information area 54 displays information such as spot information (shown) or archive information. A "Customize" button 55 permits the user to change the content of the spot and publication data.

Figure 5:
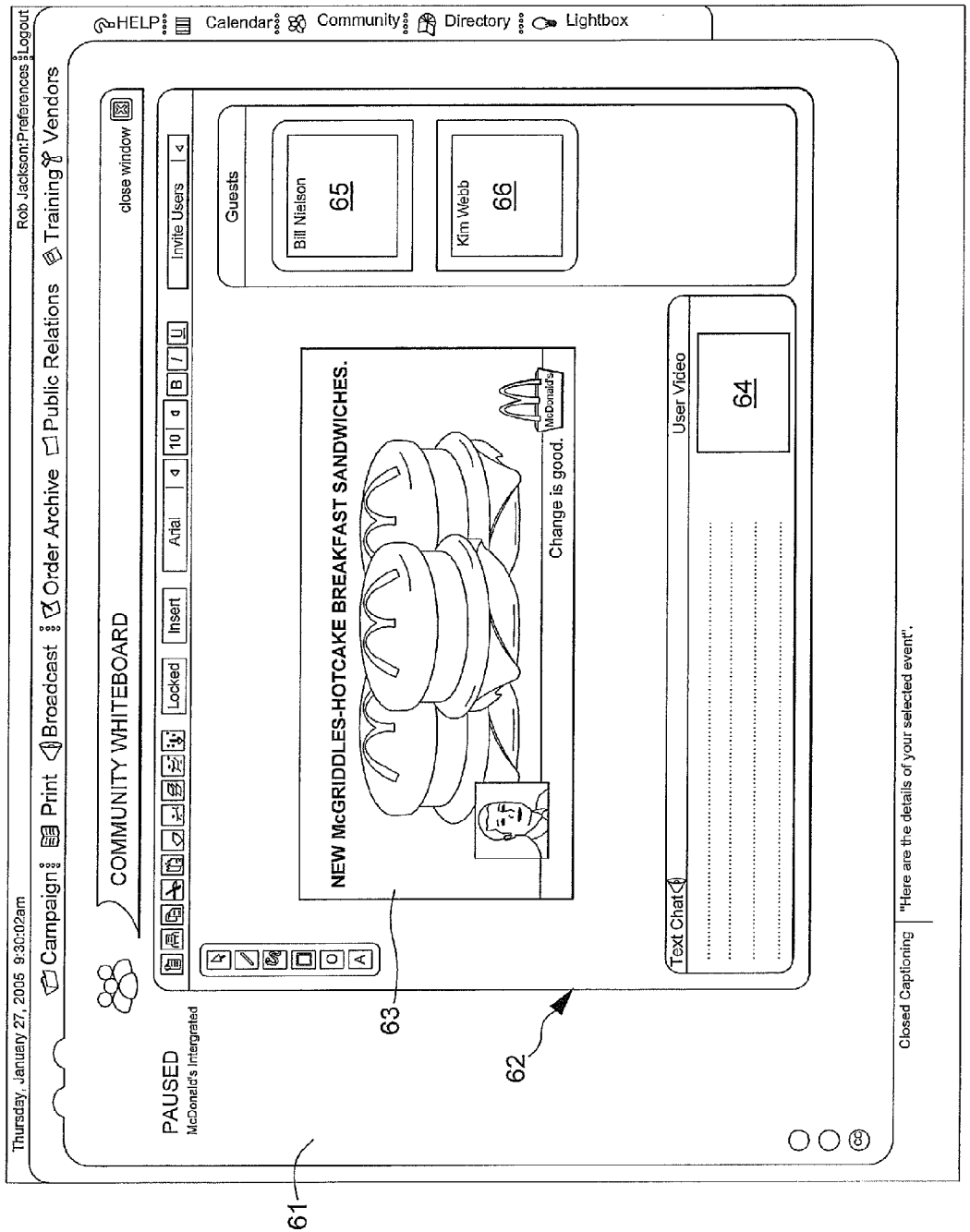
FIG. 5 is a screen display of a community conference regarding an asset.

FIG. 5 is a screen display showing a typical computer monitor display 61 generated by the system according to the present invention. Superimposed on the display 61 is a widow 62 displaying a selected asset 63. At the bottom of the window 62 is a user video display area 64 in which live video of the user is displayed. To the right in the window 63 are two guest video areas 65 and 66 in which live video of guests is displayed for video conferencing. The guests are selected by the user and appear in an expandable guest area 67 that accommodates more than the two guests 65 and 66 shown. The user 64 and the guests 65 and 66 can view the asset 63 and make changes to it.

Figure 6:
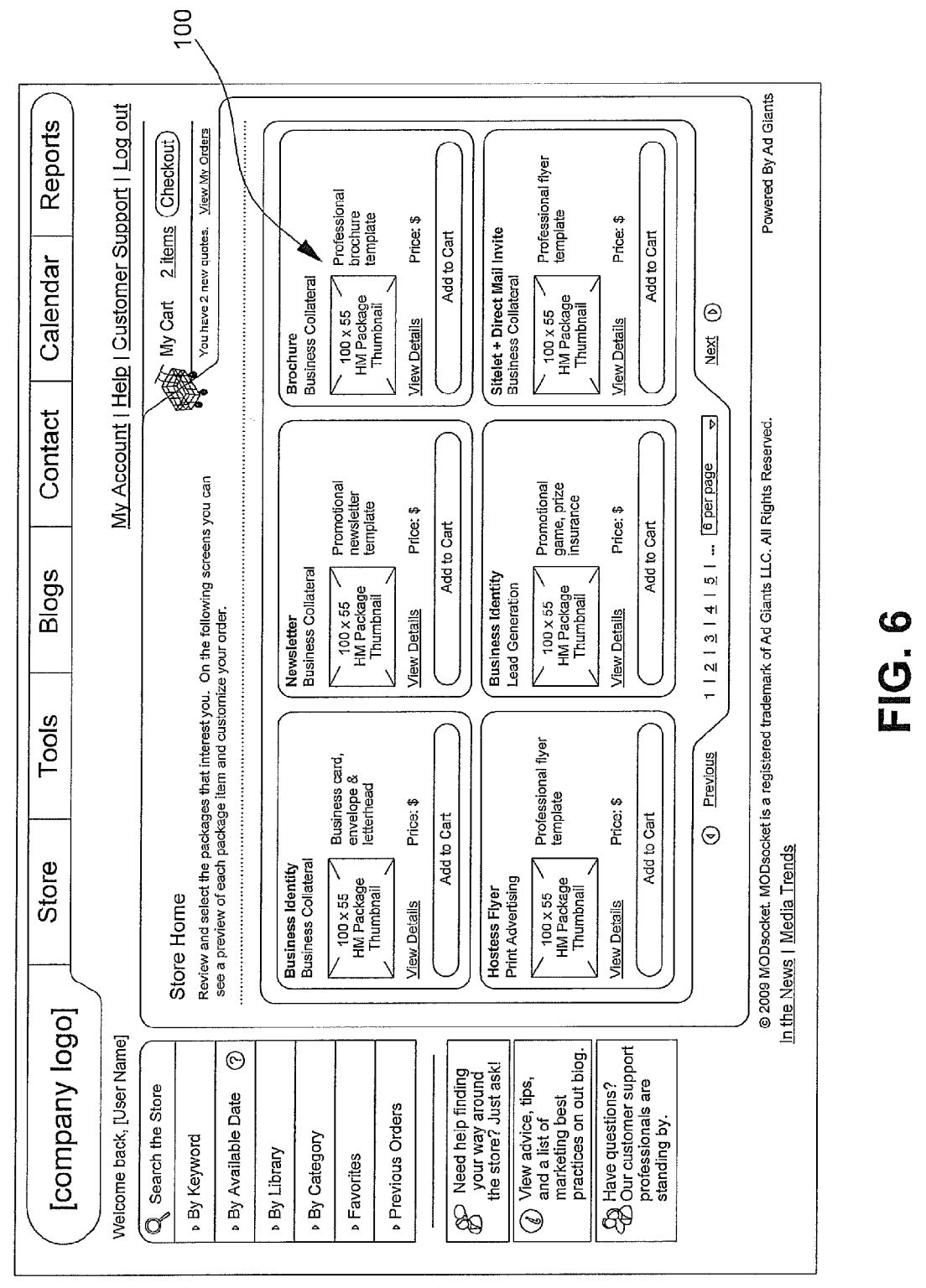

As shown in FIG. 6, the present disclosure includes The ONE System (v6)-Integrated Marketing Management (IMM) for Enterprises, also including the new V6 Marketing Storefront 100. The new storefront-inspired design of the V6 interface accommodates enhanced user proficiency—so clients and their associates can benefit from The ONE System V6 in practically no time. If the client knows how to shop online, the client already knows how to navigate the V6 Storefront 100. It provides the following features:

Easy access to marketing materials—Using V6 is as simple as selecting and purchasing a book or movie on the Internet. A client can browse for items using the storefront's 100 flexible, content-driven site navigation, or the client can search using keywords or descriptive text. Either way, accessing the client's marketing material is just a click away.

Multi-media asset and campaign libraries—The V6 Storefront 100 can accommodate virtually any form the client's marketing assets might take. This includes: print media for newspaper and magazine ads, product and sales collateral, point-of-sale, outdoor, and direct mail; Internet and rich media for email and coordinated direct mail/personalized web sitelets; broadcast for radio and TV advertising or direct-response marketing; and practically any digital media format.

Figure 7:
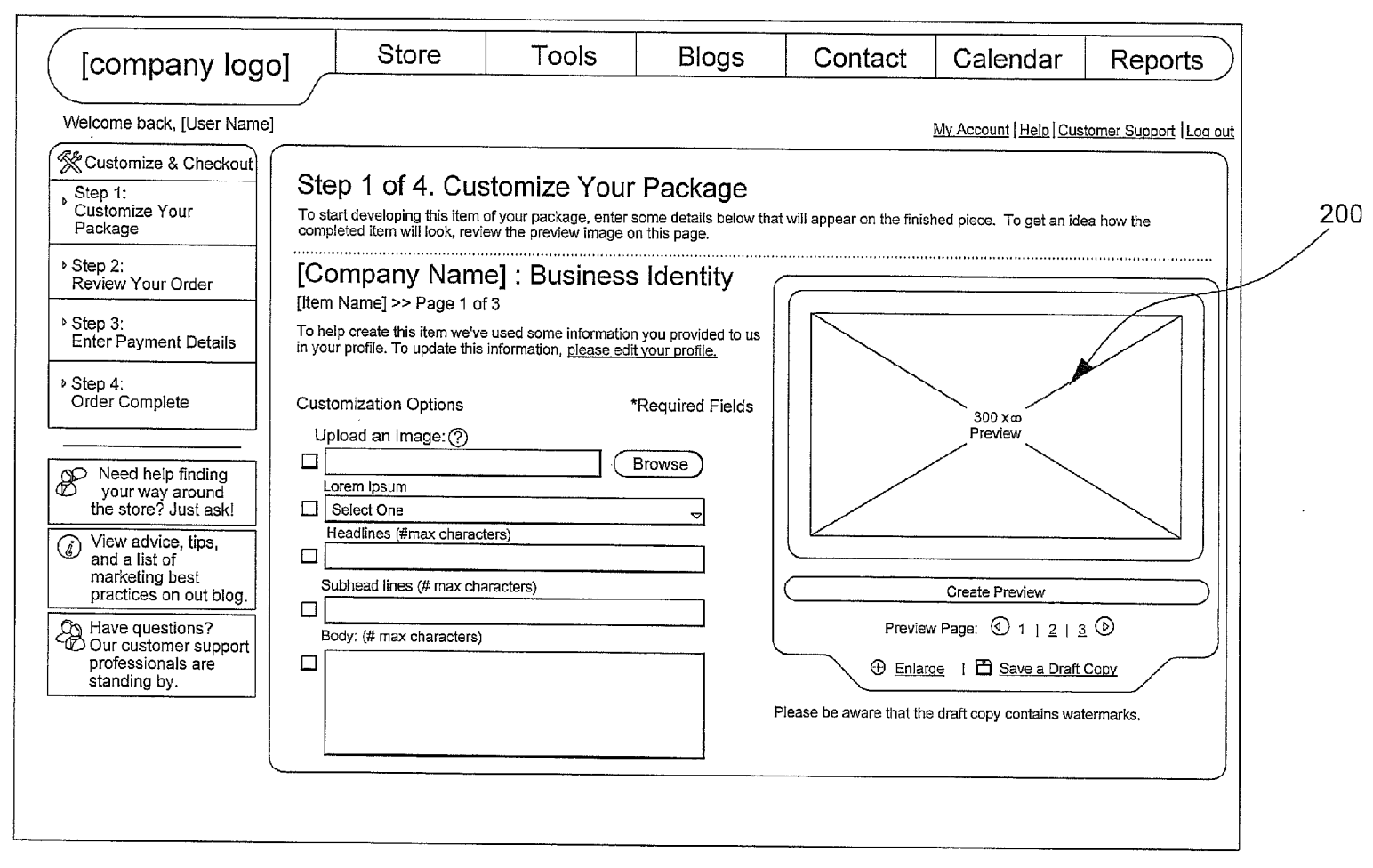

As shown in FIG. 7, the V6 Storefront 100 allows the client to transform InDesign, Quark, HTML, and Flash assets into powerful templates that the client's user community can easily access, customize, localize and personalize directly through V6 without the need for the expensive and complicated software. Other document formats, such as .doc, .docx, .pdf, .xls, .gif, .png, .eps, etc., can be stored and accessed just as easily through a V6 user interface 200 as shown.

The assets can be organized into packages that are associated with specific campaigns and can, in turn, be organized into libraries with user, region, time or other predefined access control. In other words, V6 does not impose itself upon the client's organization—it provides the client complete flexibility to organize the client's marketing assets in the way that best meets the client's needs.

Simple customization of assets and campaigns—Once uploaded into the system, the client's templates can be easily customized by the client's users to produce the localized marketing materials they require. This is accommodated by a simple asset editor that is identical for print, direct mail, email, flash, HTML, web, radio/music and TV. This means that the client's users can create a radio spot or lead-generation campaign just as easily as an email or direct mail campaign.

This is because each V6 smart template encapsulates both professional creative content and professional campaign workflow. Customization flexibility is set by the template author—so, for example, users can change localization or personalization text, but not the logo, offer details or disclaimers on the client's Spring Promotion. Or, these items can be auto-populated based on the users' profile with or without providing the ability to make changes.

Policy-driven asset and order approval—V6 empowers the client's users while keeping the client in complete control. It allows the client to approve or reject any locally customized asset and enables the client to establish order-approval policies for fulfillment transactions. Once an order is completed and submitted for fulfillment, V6 will enforce the client's company policy—ensuring that orders are approved by the client's assigned delegate before processing. All of this occurs automatically with no intervention, allowing the client and its users to achieve professional, brand-compliant results with every V6 Storefront 100 transaction.

Secure storage, access and ordering—The ONE System V6 provides a secure environment for the client's marketing assets and related activities. Security begins with our SAS-70 certified, Tier-1 hosting facility, and extends to the client's application and asset-level access security and SSL-based ecommerce transaction environment. High system availability is further enabled by best-in-class server and communications hardware, plus routine data backup and diverse access facilities.

The New V6 Partner Portal: Fulfillment at the Client's Fingertips—The marketing process extends beyond creative asset management to include activities conducted by a variety of fulfillment and marketing services partners. The ONE System V6 accommodates this through the Partner Portal which provides the following optional, but essential services:

Integrated Fulfillment—The Partner Portal provides fulfillment partners with a virtual "loading dock" where they can both define services that can be procured through the V6 Storefront 100, and interact with system users to fulfill any orders they wish to place.

Building and managing the client's own fulfillment-partner network can be hard work, so the system includes a network of professional creative and fulfillment providers that has been assembled for the client to use "right out of the box", These partners allow the client to easily select, customize and execute high-quality marketing programs including Print, Direct Mail, Email, pURL/Web, Radio/Music, and TV—on day ONE. Of course, the client can add the client's own partners or exclusively use the client's pre-established partners—the choice is entirely the client's.

Creative Services—The Ad Giants Partner Ecosystem also provides access to Ad Giants' in-house and partner-provided creative services. These include script/copywriting, art direction, graphic design, radio/music and TV production. The client can use these creative services to supplement the client's creative staff during peak periods, or to expand and diversify the client's creative capabilities.

Professional Services—Ad Giants Professional Services include template design and layout, loading and administration; custom training development and delivery; and turn-key campaign development and execution. These services are available to assist the client in the client's initial ONE System V6 launch, and at anytime afterwards.

The New Marketing Intranet: Create, Collaborate & Coordinate—Coordinating and executing marketing campaigns can be challenging. The keys to success include: access to shared information, best practices, collaboration, and coordinated effort. The ONE System V6 includes a powerful new Marketing Intranet to assist clients with this challenge. The Marketing Intranet is an optional, collaborative environment that includes a home page, ancillary information pages, shared and individual calendars, blogs and forums. The client's Marketing Intranet can be integrated with the V6 Storefront 100, and is easily administered and maintained by the client's designated administrator.

Corporate and individual marketing calendars—The new V6 Marketing Calendar helps the client communicate and coordinate the client's activities among the members of the client's user community, for example, publish a schedule of company-wide, divisional or regional promotions to help everyone know what is happening and when. Individual team members can then add their own supporting (or independent) events to synchronize their activities with the big picture.

Blogs—Designated business and thought leaders can easily use V6 blogging features to share information and best practices with the members of the client's marketing community. Blogs may be used to publish information or to share ideas and allow the client's audience to interact with the blogger and other users by posting threaded comments in response to the blog post, or other posted comments.

Forums—V6 forums are another resource to encourage information sharing and collaboration. Forum containers and topic areas are configured to the client's specifications. These allow the client's administrator and forum participants to post information, questions or answers, and to engage in threaded discussion with other users.

The ONE System V6 Difference—The V6 difference can be summarized in a single word. And the word is: ONE. With it, the client gets: ONE system to store and access all of the client's advertising and direct marketing resources; ONE system to customize, localize and personalize all of the client's sales and marketing material; ONE system to order and fulfill all of the client's advertising and direct marketing programs; ONE system to collaborate, coordinate, and engage with the client's team; ONE system to learn and administer; and ONE system to master the client's marketing challenges The present disclosure further includes the PitchRocket (v6)—Interactive Direct Marketing for Enterprises. Key features of the PitchRocket (v6) include: Personalized Invitations; Multi-Channel Messaging; Immersive Sitelets; Professional Marketing Templates; Instant Response Notification, Tracking & Reporting; and Turn-key Fulfillment.

Personalized Invitations—PitchRocket enables personalized conversations between the client and one or more prospects or customers (guests). The PitchRocket invitation includes personalized messaging plus an online response path in the form of a personalized URL (PURL). The client benefits from higher direct marketing response rates and greater likelihood to purchase. According to Etailing Group Study, "The Executive Guide to Captivating Customers.", 77% of consumers report that they have made additional purchases when they have encountered personalized product recommendations online. See http://www.pr-inside.com/mybuys-and-the-e-tailing-group-uncover-r627206.htm. More than half of consumers say they usually peruse those recommendations when they are offered. Past DMA studies have also demonstrated this benefit " . . . the results of well-executed, personalized communications were stunning. Sellers commonly experienced, and continue to experience, a five- to 10-fold increase in response and conversion rates based on personalized communications." See http://www.the-dma.org/whitepapers/MultiChannelMarketingFeb04.pdf.

Multi-Channel Messaging—PitchRocket can send either Email or direct mail invitations to the client's prospects. The choice of email or direct mail allows the client to choose the medium that works best for the person the client is trying to reach, at the time that the client is trying to reach her. The choice depends upon a number of factors including available contact information, the client's relationship with the prospect, the buying stage of the prospect, the prevailing mode of marketing to the prospect's segment, the number of previous impressions, message complexity, etc. PitchRocket allows the client to choose the best option for the client's specific case—both invitation options include a pURL that links the client's guest to a personalized, immersive, web-based, interactive meeting/conversation space (sitelet). The client benefits from higher response and conversion rates. As found in a DMA 2004 Multichannel study: "Sellers commonly experienced, and continue to experience, a five- to 10-fold increase in response and conversion rates based on personalized communications. When print, e-mail, Web and telemarketing are combined in integrated, multi channel campaigns, the results are even greater". See http://www.the-dma.org/whitepapers/MultiChannelMarketingFeb04.pdf.

Figure 8:
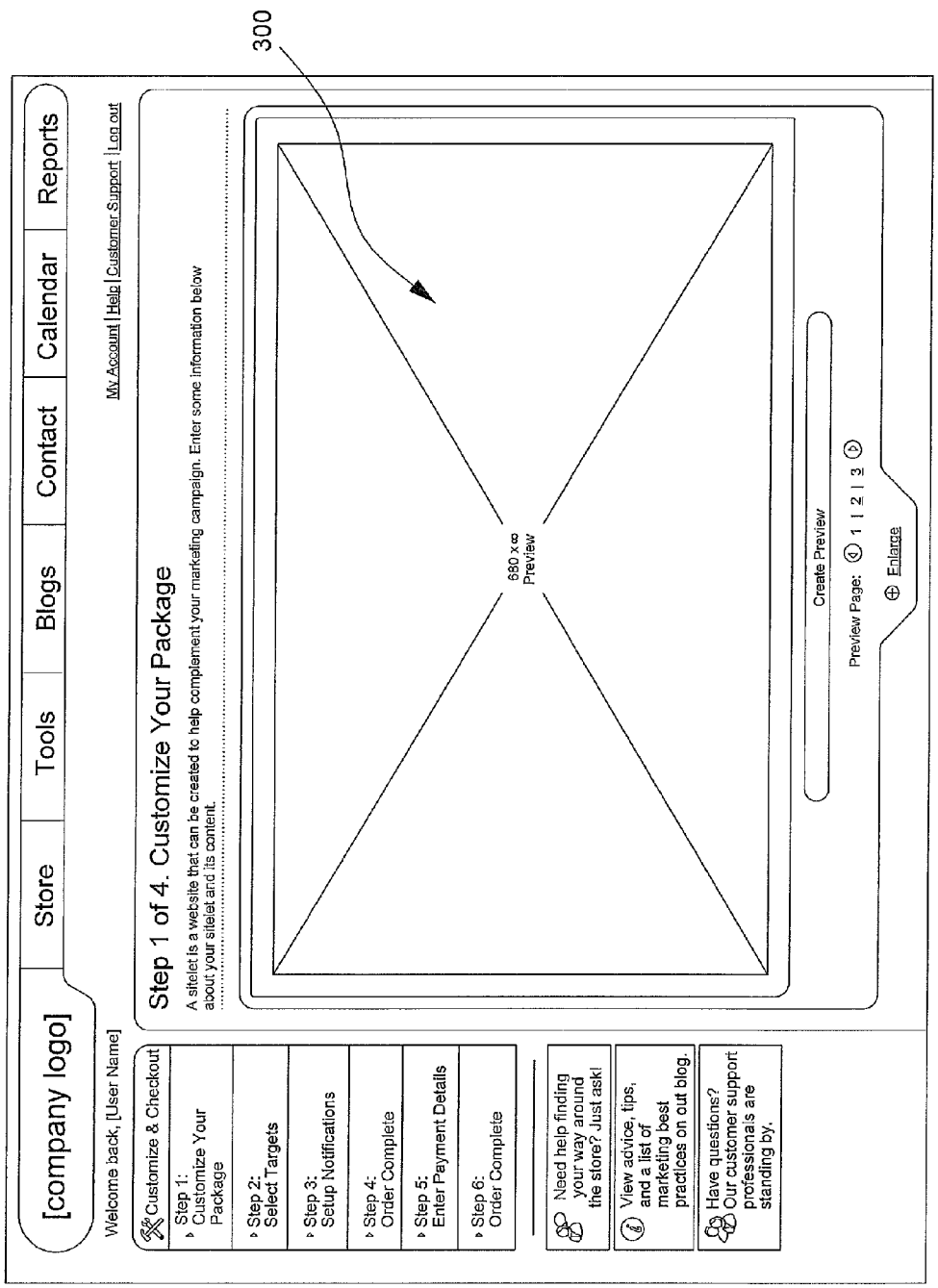
FIG. 8 is a screen display of an interface for customizing a sitelet.

Immersive Sitelets—The sitelet is a small, self-contained, Flash-based website personalized and optimized to deliver the client's message using the best combination of text, image, audio and video content. Another interface 300, as shown in FIG. 8, permits the client or client to modify the sitelet as desired. The personalized sitelet provides an immersive environment that encourages the client's guest to achieve a state of "flow" while receiving the client's message. Flow is the mental state of operation in which the person is fully immersed in what he or she is doing by a feeling of energized focus, full involvement, and success in the process of the activity. Proposed by Mihály Csikszentmihályi, the positive psychology concept has been widely referenced across a variety of fields. See http://en.wikipedia.org/wiki/Flow_(psychology). This is possible because the online environment, when properly calibrated, can foster the preconditions for achieving flow: involvement, vividness, interactivity, and skill/challenge. These can in-turn lead to the immediate precursors of flow: attention, telepresence and control. When in the flow state, individuals are more likely to exhibit mindset conducive to: learning, creativity, exploration, and behavioral change. The benefit to the client is higher quality leads and higher conversion rates, since computer-mediated environments (CME) that are conducive to flow yield positive attitudes and outcomes for users, and have broad implications for e-commerce.

Professional Marketing Templates—PitchRocket includes a standard library of professionally, created Email, Direct Mail and Sitelet templates. These templates support achievement of very high response rates when used with good marketing lists and effective messaging. The benefit to the client is easy customization and execution of the client's marketing campaign right "Out of the box." This is made possible through proven, PitchRocket-supplied, high-impact, professional, IDM templates.

Instant Response Notification, Tracking & Reporting—PitchRocket tracks every prospect and monitors activity on a per-prospect basis as it is occurring. This allows the client to set qualifying thresholds on a per-campaign basis. PitchRocket also allows clients to assign individual prospects to one or more assigned responder(s). When a prospect crosses a qualifying threshold, automatic notification is sent to the assigned responder via email. This notification provides prospect-specific details that best equip the responder to follow-up and engage the prospect. The benefit to the client is significantly increased probability of connecting with and converting a prospect. This is supported by a 2007 MIT Study19 that found the following: 1) The odds of contacting a lead increase by 100× if attempted within 5 minutes versus 30 minutes; 2) The odds of qualifying a lead increase by 21× if attempted within 5 minutes versus 30 minutes; and 3) Every attempt to contact made after 20 hours hurts the contact rate more. See InsideSales.com Lead Response Management study conducted by Dr. James Oldroyd of the Sloan School of Management at the Massachusetts Institute of Technology (MIT) in 2007, and released at MarketingSherpa's B-to-B Demand Generation Summit 2007.

Turn-key Fulfillment—PitchRocket supplies the client with integrated direct mail list procurement, printing, postal mail and e-mail processing, pURL generation and custom/personalized sitelet creation. This allows the client to define, customize, localize, personalize and execute the client's direct marketing campaign—all from a single application. The benefit to the client is that professional direct marketing is made as easy as shopping on the internet. The client does not need to worry about coordinating designers, printers, fulfillment packagers, or shippers.

The present disclosure also includes the MODsocket—Marketing On Demand Ecosystem for SMBs. Key features of the MODsocket include: the PitchRocket Interactive Direct Marketing (IDM) Feature set as described above; the ONE System Integrated Marketing Management (IMM) Feature set as described above; Professional Marketing Templates; Turn-key Fulfillment; Marketing Community; and MODsocket Points.

Professional Marketing Templates—MODsocket includes a standard library of professionally, created marketing templates. These include templates for branding and business identity, awareness, lead generation, store traffic, direct order and fundraising using print, email, direct mail, web, radio and tv media types. The MODsocket library includes industry-themed (Finance, Insurance, Real Estate, Medical, Legal, Technical and Professional Services), and open-themed creative assets. The benefit to the client is easy customization and execution of professional marketing campaign right "Out of the box," This is made possible through proven, Ad Giants-supplied, high-impact, professional marketing templates.

Turn-key Fulfillment—MODsocket supplies the client with complete integrated, marketing fulfillment including direct mail list procurement, printing, postal mail and e-mail processing, pURL generation and custom/personalized site-let creation, radio and tv post-production and execution services. This allows the client to define, customize, localize, personalize and execute the client's marketing campaign—all from a single application. The benefit to the client is that MODsocket makes professional marketing as easy as shopping on the internet for small and midsized businesses.

Marketing Community—Marketing Thought Leadership is as important for SMBs as it is to the large enterprise marketer. However, most SMBs are busy just running their businesses. That is why MODsocket includes the MODsquad—AdGiant's panel of marketing thought leaders, how-to articles, frequently asked questions and user forums where SMBs can easily learn what works from the experts and from other users. The benefit is that the client can be more productive—no more hours of searching to find what works and what does not. Built-in thought leadership means that the latest marketing knowledge is just a click away for the SMB client.

MODsocket Points—MODsocket values and encourages community spirit by awarding MODsocket Points for community-enhancing behavior such as answering questions and making helpful suggestions in the user forums, responding to MODsquad blog posts and user polls, and inviting others to join and experience the benefits MODsocket. SMB clients can reduce their overall marketing costs by using MODsocket Points to offset their monthly subscription fees. The benefit to the client is that MODsocket Points can be used to completely offset the monthly subscription fee—thereby making MODsocket a pure pay-for-what-you-use proposition.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A system for marketing management, comprising:
an administrator server computer running a computer program and permitting authorized access to a database of the administrator server computer, the database storing a plurality of modifiable advertising assets including page, audio and video components, the administrator server computer permitting dynamic professional advertisement creation by an advertising agency and a client authorized to access the database through modification of the modifiable advertising assets;
an advertising agency computer remotely connected and in communication with the administrator server computer, the advertising agency permitted to initiate the dynamic professional advertisement creation through the advertising agency computer, wherein the advertising agency can login at the advertising agency computer, select and modify individual ones of the modifiable advertising assets stored in the database after the dynamic professional advertisement creation has been initiated, and a display of the selected one of the modifiable advertising assets is changed for purposes of advertising one of a product and a service;
a client computer remotely connected and in communication with the administrator server computer, the client permitted to initiate the dynamic professional advertisement creation through the client computer, wherein the client can login at the client computer, select and modify individual ones of the modifiable advertising assets stored in the database after the dynamic professional advertisement creation has been initiated, and the display of the selected one of the modifiable advertising assets is changed for purposes of advertising the one of the product and the service; and
a fulfillment party computer remotely connected and in communication with the administrator server computer, a fulfillment party executing a marketing program including the professional advertisement created through the modification of the selected one of the modifiable advertising assets when an order is transmitted from the administrator server computer to the fulfillment party computer by one of the advertising agency and the client, wherein the fulfillment party includes one of an advertising display party for running the selected one of the modifiable advertising assets when ordered and a broker for placing the selected one of the modifiable advertising assets with a media outlet when ordered by one of the advertising agency and the client.

2. The system according to claim 1, wherein each of the advertising agency computer, the client computer, and the fulfillment party computer are remotely connected to the administrator server computer through the Internet.

3. The system according to claim 1, wherein the execution of the marketing program by the fulfillment party includes providing the professional advertisement created through the modification of the selected one of the modifiable advertising assets in at least one of print, direct mail, email, pURL/web, radio/music, and television.

4. The system according to claim 1, wherein the administrator server computer controls a flow of communication between each of the advertising agency computer, the client computer, and the fulfillment party computer.

5. The system according to claim 1, wherein the modifiable advertising assets include television spots, radio spots, newspaper ads, and billboard ads.

6. The system according to claim 1, wherein the administrator server computer provides a virtual marketing storefront providing the advertising agency and the client with access to a multi-media advertisements and campaigns library stored in the database, a plurality of tools for customization of the advertisements and campaigns in the multi-media advertisements and campaigns library, secure storage, an access and ordering module, and a customizable approval process for the selected one of the modifiable advertising assets when modified.

7. The system according to claim 1, wherein the fulfillment party computer does not have access to select and modify individual ones of the modifiable advertising assets stored in the database after the dynamic professional advertisement creation has been initiated.

8. A method for marketing management, the method comprising the steps of:
a. providing an administrator server computer running a computer program and permitting authorized access to a database of the administrator server computer, the database storing a plurality of modifiable advertising assets including page, audio and video components, the administrator server computer permitting dynamic professional advertisement creation by an advertising agency and a client authorized to access the database through modification of the modifiable advertising assets, the administrator server computer in communication with an advertising agency computer, a client computer, and a fulfillment party computer remotely connected with the administrator server computer;

b. permitting each of an advertising agency computer and a client computer to initiate the dynamic professional advertisement creation on the administrator server computer;

c. permitting at least one of the advertising agency and the client to select and modify individual ones of the modifiable advertising assets stored in the database after the dynamic professional advertisement creation has been initiated, wherein a display of the selected one of the modifiable advertising assets is changed for purposes of advertising one of a product and a service; and d. permitting at least one of the advertising agency and the client to order a marketing program including the professional advertisement created through the modification of the selected one of the modifiable advertising assets, the order transmitted from the administrator server computer to the fulfillment party computer by one of the advertising agency and the client, wherein a fulfillment party executes the marketing program including the professional advertisement, wherein the fulfillment party includes one of an advertising display party for running the selected one of the modifiable advertising assets when ordered and a broker for placing the selected one of the modifiable advertising assets with a media outlet when ordered by one of the advertising agency and the client.

9. The method according to claim 8, wherein each of the advertising agency computer, the client computer, and the fulfillment party computer are remotely connected to the administrator server computer through the Internet.

10. The method according to claim 8, wherein the execution of the marketing program by the fulfillment party includes providing the professional advertisement created through the modification of the selected one of the modifiable advertising assets in at least one of print, direct mail, email, pURL/web, radio/music, and television.

11. The method according to claim 8, wherein the administrator server computer controls a flow of communication between each of the advertising agency computer, the client computer, and the fulfillment party computer.

12. The method according to claim 8, wherein the modifiable advertising assets include television spots, radio spots, newspaper ads, and billboard ads.

13. The method according to claim 8, wherein the administrator server computer provides a virtual marketing storefront providing the advertising agency and the client with access to a multi-media advertisements and campaigns library stored in the database, a plurality of tools for customization of the advertisements and campaigns in the multimedia advertisements and campaigns library, secure storage, an access and ordering module, and a customizable approval process for the selected one of the modifiable advertising assets when modified.

14. The method according to claim 8, wherein the fulfillment party computer does not have access to select and modify individual ones of the modifiable advertising assets stored in the database after the dynamic professional advertisement creation has been initiated.

* * * * *